(12) United States Patent
Kume et al.

(10) Patent No.: US 10,981,462 B2
(45) Date of Patent: Apr. 20, 2021

(54) POWER SUPPLY SYSTEM FOR VEHICLE

(71) Applicant: HONDA MOTOR CO., LTD., Tokyo (JP)

(72) Inventors: Yasuhisa Kume, Wako (JP); Mitsuhiro Takeda, Wako (JP); Takahiro Hagimoto, Wako (JP); Satoyoshi Oya, Wako (JP); Tomoaki Ono, Wako (JP); Somei Nakatomi, Wako (JP); Katsuya Inoue, Wako (JP); Hiroshi Otsuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 75 days.

(21) Appl. No.: 16/419,004

(22) Filed: May 22, 2019

(65) Prior Publication Data

US 2019/0359074 A1    Nov. 28, 2019

(30) Foreign Application Priority Data

May 25, 2018    (JP) .............................. JP2018-100761

(51) Int. Cl.
*B60K 17/356*    (2006.01)
*B60L 1/00*    (2006.01)
(Continued)

(52) U.S. Cl.
CPC ............ *B60L 53/50* (2019.02); *B60K 17/356* (2013.01); *B60L 1/00* (2013.01); *B60L 50/60* (2019.02);
(Continued)

(58) Field of Classification Search
CPC ......... B60K 17/356; B60L 1/00; B60L 1/003; B60L 1/02; B60L 15/007; B60L 15/2045;
(Continued)

(56) References Cited

U.S. PATENT DOCUMENTS

| 2017/0117827 A1* | 4/2017 | Ono | .......................... B60L 7/14 |
| 2018/0205341 A1* | 7/2018 | Syed | ......................... B60L 7/18 |

(Continued)

FOREIGN PATENT DOCUMENTS

| JP | 04-183206 | 6/1992 |
| JP | 2005-033899 | 2/2005 |
| JP | 2015-216725 | 12/2015 |

OTHER PUBLICATIONS

Japanese Office Action for corresponding JP Application No. 2018-100761, Jan. 8, 2020 (w/ English machine translation).

*Primary Examiner* — Toan T Vu
(74) *Attorney, Agent, or Firm* — Mori & Ward, LLP

(57) ABSTRACT

To provide a system of low cost and low loss capable of the supply of electric power according to characteristics of each of a plurality of motors from a single battery. A power supply system for a vehicle of the present invention includes: a high-voltage battery; a first inverter which connects with the high-voltage battery; a motor described later which connects with the first inverter; a high-voltage DCDC converter which is connected to the high-voltage battery and steps down the voltage of the high-voltage battery; a second inverter which connects with the high-voltage battery; and a motor described later which connects with the second inverter.

7 Claims, 5 Drawing Sheets

(51) Int. Cl.
    *B60L 50/60*     (2019.01)
    *B60L 53/50*     (2019.01)
    *B60L 53/60*     (2019.01)
    *H02J 7/00*     (2006.01)
    *H02M 3/158*     (2006.01)
    *H02M 7/5387*     (2007.01)
    *H02P 3/14*     (2006.01)
    *H02P 5/747*     (2006.01)

(52) U.S. Cl.
    CPC ............. *B60L 53/60* (2019.02); *H02J 7/00* (2013.01); *H02M 3/158* (2013.01); *H02M 7/53873* (2013.01); *H02P 3/14* (2013.01); *H02P 5/747* (2013.01); *B60L 2210/10* (2013.01); *B60L 2240/547* (2013.01); *B60Y 2200/91* (2013.01); *B60Y 2300/91* (2013.01); *B60Y 2400/61* (2013.01); *H02P 2201/11* (2013.01)

(58) Field of Classification Search
    CPC .......... B60L 15/32; B60L 50/60; B60L 53/22; B60L 53/50; B60L 53/60; B60L 2210/10; B60L 2220/42; B60L 2240/547; B60L 2260/28; H02J 1/082; H02J 7/00; H02J 2207/40; H02J 2310/48; H02M 3/155; H02M 3/158; H02M 3/1584; H02M 7/5387; H02M 7/53873; H02M 2001/007; B60Y 2200/91; B60Y 2300/91; B60Y 2400/61; H02P 2201/11; H02P 3/14; H02P 5/74; H02P 5/747; Y02T 10/64; Y02T 10/70; Y02T 10/7072; Y02T 10/72; Y02T 10/92; Y02T 90/12; Y02T 90/14
    USPC ................................................. 307/9.1, 10.1
    See application file for complete search history.

(56) References Cited

U.S. PATENT DOCUMENTS

2018/0354374 A1\* 12/2018 Lee ................. B60L 58/20
2019/0302192 A1\* 10/2019 Gokyu ............. H01M 10/441

\* cited by examiner

FIG. 4

| EFFICIENCY [%] | | VOLTAGE[V] | | | |
|---|---|---|---|---|---|
| | | 100 | 200 | 300 | 400 |
| OUTPUT [kw] | 0 | 100 | 100 | 100 | 100 |
| | 2 | 80 | 75 | 70 | 65 |
| | 4 | ... | ... | ... | ... |
| | 6 | ... | ... | ... | ... |
| | 8 | ... | ... | ... | ... |
| | 10 | 60 | 55 | 50 | 45 |

POWER SUPPLY SYSTEM FOR VEHICLE

This application is based on and claims the benefit of priority from Japanese Patent Application No. 2018-100761, filed on 25 May 2018, the content of which is incorporated herein by reference.

BACKGROUND OF THE INVENTION

Field of the Invention

The present invention relates to the power supply system for a vehicle.

Related Art

Conventionally, a power supply system for a vehicle has been known which performs electric power supply to a plurality of drive motors via a single voltage converter from a battery. The voltage of the battery is converted to a fixed voltage by the voltage converter, and each drive motor is driven by the converted voltage (Patent Document 1).

Patent Document 1: Japanese Unexamined Patent Application, Publication No. 2015-216725

SUMMARY OF THE INVENTION

However, with the configuration of Patent Document 1, since the plurality of motors are connected in parallel to the opposite side of the battery relative to the single voltage converter, the voltages supplied to each motor are equal potentials. For this reason, it is difficult for a plurality of motors of different characteristics to perform high efficiency operation at each voltage, and as a result thereof, there has been a problem in that power loss increases.

The present invention has an object of providing a system of low cost and low loss capable of the supply of electric power according to the characteristic of each of a plurality of motors from a single battery.

A power supply system (for example, the power supply system 1) for a vehicle according to a first aspect of the present invention is characterized by including: a storage battery (for example, the high-voltage battery 21 described later); a first power converter (for example, the first inverter 23 described later) which connects with the storage battery; a first drive electric motor (for example, the motor RM described later) which connects with the first power converter; a voltage converter (for example, the high-voltage DCDC converter 22 described later) which is connected to the storage battery and steps down voltage of the storage battery; a second power converter (for example, the second inverter 24 described later) which connects with the voltage converter; and a second drive electric motor (for example, the motor FM described later) which connects with the second power converter.

According to the power supply system for a vehicle as described in the first aspect, the supply of electric power according to the characteristics of each of a plurality of motors becomes possible and thus a system of low cost and low loss can be provided.

According to a second aspect of the present invention, either one of the first drive electric motor and the second drive electric motor as described in the first aspect may be a front-wheel drive electric motor (for example, the motor FM described later) which drives front wheels, and the other one among the first drive electric motor and the second drive electric motor may be a rear-wheel drive electric motor (for example, the motor RM described later) which drives rear wheels.

According to the power supply system for a vehicle as described in the second aspect, a four-wheel drive automobile having different characteristics in the front wheel and rear wheels of the vehicle can be provided, and thus the marketability can be improved.

According to a third aspect of the present invention, the second drive electric motor as described in the second aspect may be an electric motor of higher output than the first drive electric motor, and is for rear-wheel driving.

According to the power supply system for a vehicle as described in the third aspect, the provision of a four-wheel drive automobile of good transfer of traction during acceleration and superior in acceleration performance becomes possible, and thus the marketability can be improved.

According to a fourth aspect of the present invention, the first drive electric motor as described in the second aspect may be an electric motor of higher output than the second drive electric motor, and is for front-wheel driving.

According to the power supply system for a vehicle as described in the fourth aspect, it becomes possible to provide a four-wheel drive automobile which can appropriately obtain regenerative electric power during braking, and is superior in straight line stability, and thus the marketability can be improved.

According to a fifth aspect of the present invention, the power supply system as described in any one of the first to fourth aspects may further include a plurality of accessories (for example, the accessory 6 described later) connected in parallel between the voltage converter and the second power converter.

According to the power supply system for a vehicle as described in the fifth aspect, it is possible to avoid an unnecessary cost increase such as for handling of voltage increase of accessories.

According to a sixth aspect of the present invention, the voltage converter as described in the fifth aspect may be controlled based on efficiency of the plurality of accessories and efficiency of the second drive electric motor.

According to the power supply system for a vehicle as described in the sixth aspect, it is possible to effectively reduce loss of the overall system (accessory, second drive electric motor).

According to a seventh aspect of the present invention, the power supply system as described in any one of the first to sixth aspects may further include: a DC charging unit (for example, the DC charging unit 4 described later) capable of charging by way of a DC charging source; a high-voltage charging path (for example, the high-voltage charging path described later) which connects from the DC charging unit to between the voltage converter and the storage battery; and a low-voltage charging path (for example, the low-voltage charging path described later) which connects from the DC charging unit to between the voltage converter and the second power converter, in which the power supply system may select a charging path according to output of an external charging source connected to the DC charging unit.

According to the power supply system for a vehicle as described in the seventh aspect, by utilizing the voltage converter of the system including a plurality of motors having different characteristics, it is possible to provide a system capable of selecting the charging path according to the output of the external charging source, and capable of handling the infrastructure environment at low cost.

According to an eighth aspect of the present invention, in the power supply system as described in the seventh aspect, the voltage converter variably may control voltage on a side of the DC charging unit according to the voltage of the storage battery, upon performing charging of the storage battery via the low-voltage charging path.

According to the power supply system as described in the eighth aspect, in a case of the voltage of the storage battery being higher than the maximum output voltage of the low-voltage charger, it is possible to charge in a state in which the charging output is the maximum. Alternatively, by going through an element capable of step-up/down of the voltage from the charger, it becomes possible to charge in a state in which the charger output is always the maximum, irrespective of the state of the rechargeable battery.

According to a ninth aspect of the present invention, in the power supply system as described in the seventh or eighth aspect, the voltage converter may variably control the voltage on the side of the DC charging unit according to the voltage of the external electric supply destination, upon performing electric supply to outside via the low-voltage charging path.

According to the power supply system for a vehicle as described in the ninth aspect, when there is no longer storage battery capacity, and supplying electricity to a stuck electric vehicle, electricity supply according to the system voltage of the supplied vehicle is possible.

According to the present invention, it is possible to provide a system of low cost and low loss capable of the supply of electric power according to the characteristic of each of a plurality of motors from a single battery.

BRIEF DESCRIPTION OF THE DRAWINGS

FIG. 4 is an example of a table showing the efficiency of each device according to the first embodiment of the present invention.

DETAILED DESCRIPTION OF THE INVENTION

Figure 1:
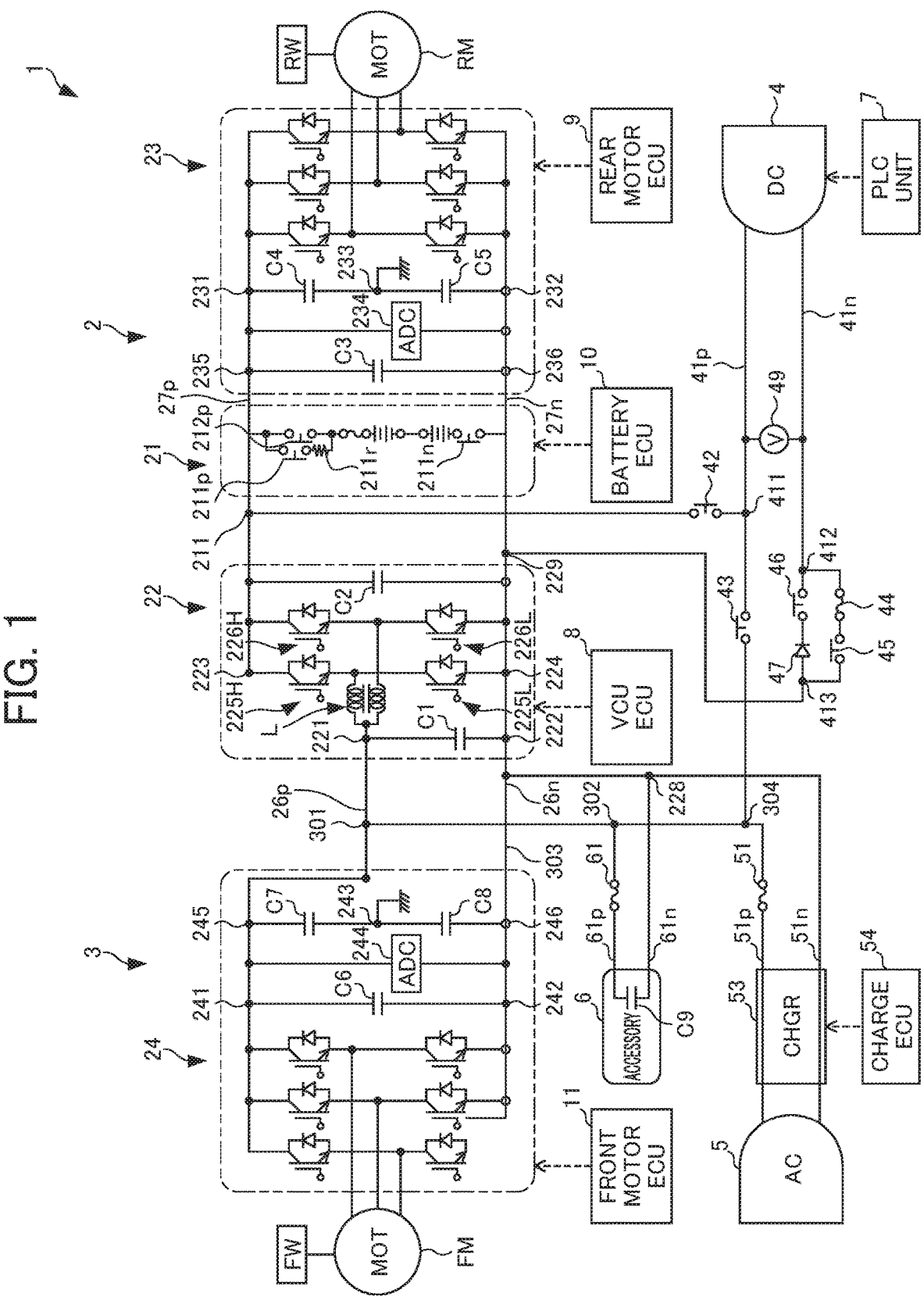
FIG. 1 is a view showing a power supply system for a vehicle according to a first embodiment of the present invention.

Hereinafter, a first embodiment of the present invention will be explained by referencing the drawings. FIG. 1 is a view showing the configuration of an electric vehicle V (hereinafter simply referred as "vehicle") equipped with a power supply system 1 according to the present embodiment. It should be noted that, in the present embodiment, although a four-wheel drive electric automobile of including drive motors is explained as the vehicle V in the example, the present invention is not to be limited thereto. The electric power system according to the present invention is applicable to any vehicle so long as being a vehicle which travels using electricity stored in a battery such as a two-wheel drive electric automobile, hybrid vehicle or fuel-cell vehicle.

The vehicle V includes the power supply system 1, drive motor FM of front wheels FW, and drive motor RM of rear wheels RW. The drive motors FM and RM mainly generate motive power for the vehicle V to travel. The output shafts of the drive motors FM and RM are coupled to the drive wheels FW and RW via a power transmission system which is not illustrated. The torque generated by the drive motors FM and RM by supplying electric power to the drive motors FM and RM from the power supply system 1 is respectively transmitted to the drive wheels FW and RW via a power transmission system which is not illustrated, thereby causing the drive wheels FW and RW to rotate and cause the vehicle V to travel. In addition, the drive motors FM and RM act as generators during deceleration generation of the vehicle V. The electric power generated by the electric motors M is charged to a high-voltage battery 21 equipped to the power supply system 1.

The power supply system 1 includes a high-voltage circuit 2 provided to the high-voltage battery 21, a low-voltage circuit 3 of lower voltage than the high-voltage battery 21, the drive motor FM which drives the front wheels FW, the drive motor RM which drives the rear wheels RW, a DC charging unit 4 capable of supplying electric power to the high-voltage circuit 2 and low-voltage circuit 3, an AC charging unit 5 capable of supplying electric power to the low-voltage circuit 3, and an accessory 6 having a heater, etc.

The high-voltage circuit 2 includes the high-voltage battery 21, a high-voltage DCDC converter 22 serving as a voltage converter, first electric power lines 26p, 26n which connect both positive/negative electrodes of the high-voltage battery 21 with the low-voltage side positive terminal 221 and low-voltage side negative terminal 222 of the high-voltage DCDC converter 22, a first inverter 23 serving as a power converter, and second electric power lines 27p, 27n which connect the high-voltage side positive terminal 223 and high-voltage side negative terminal 224 of the high-voltage DCDC converter 22 with the DC I/O side of the first inverter 23.

The high-voltage battery 21 is a secondary battery which can be both discharged to convert chemical energy into electrical energy, and charged to convert electrical energy into chemical energy. Hereinafter, a case of using a so-called lithium-ion storage battery which carries out charge/discharge by lithium ions migrating between electrodes as this high-voltage battery 21 will be explained; however, the present invention is not to be limited thereto.

The high-voltage DCDC converter 22 is provided between the first electric power lines 26p, 26n and the second electric power lines 27p, 27n. The low-voltage side positive terminal 221 and low-voltage side negative terminal 222 of the high-voltage DCDC converter 22 are connected to the high-voltage battery 21 via the first electric power lines 26p, 26n as mentioned above, respectively. The high-voltage side positive terminal 223 and high-voltage side negative terminal 224 of the high-voltage DCDC converter 22 are connected to the high-voltage battery 21 and first inverter 23 via the second electric power lines 27p, 27n.

The high-voltage DCDC converter 22 is a two-way DCDC converter configured by combining a reactor L, a first smoothing capacitor C1, high-arm elements 225H, 226H, low-arm elements 225L, 226L, a second smoothing capacitor C2, and a negative bus bar 227.

The high-arm element 225H includes a known power switching element such as IGBT or MOSFET, and a diode connected in parallel to this power switching element. The low-arm element 225L includes a known power switching element such as IGBT or MOSFET and a diode connected in parallel to this power switching element. This high-arm elements 225H and low-arm element 225L are connected in this order in series between the high-voltage side positive terminal 223 and negative bus bar 227. The high-arm element 226H and low-arm element 226L are also connected in this order in series between the high-voltage side positive terminal 223 and negative bus bar 227.

A collector of the power switching element of the high-arm element 225H is connected to the high-voltage side positive terminal 223, and the emitter thereof is connected to the collector of the low-arm element 225L. The emitter of the power switching element of the low-arm element 225L is connected to the negative bus bar 227. The forward direction of diodes provided to the high-arm element 225H is an orientation directed from the reactor L to the high-voltage side positive terminal 223. In addition, the forward direction of diodes provided to the low-arm element 225L is an orientation directed from the negative bus bar 227 to the reactor L. One terminal of the reactor L is connected between the emitter of the high-arm element 225H and the collector of the low-arm element 225L, and another terminal of the reactor L is connected between the high-arm element 226H and the collector of the low-arm element 226L.

These high-arm element 225H, 226H and low-arm elements 225L, 226L are turned ON or OFF by gate drive signals generated by a VCUECU 8, respectively.

The high-voltage DCDC converter 22 exhibits a step-down function on the current in both directions, by driving ON/OFF the above-mentioned elements 225H, 225L in accordance with gate drive signals generated at a predetermined timing from the VCUECU 8. Step-down function refers to a function of stepping down the voltage applied to the terminals 223, 224 on the high-voltage side and outputting to the terminals 221, 222 on the low-voltage side, whereby it is also possible to flow current from the second electric power lines 27p, 27n to the first electric power lines 26p, 26n, and flow current from the first electric power lines 26p, 26n to the second electric power lines 27p, 27n.

The first inverter 23 is a PWM inverter by way of pulse width modulation including a bridge circuit constituted by bridge connecting a plurality of switching elements (e.g., IGBT), for example, and includes a function of converting between DC power and AC power. The first inverter 23 is connected to the terminal 231 of the second electric power line 27p and the terminal 232 of the second electric power line 27n at the DC I/O side thereof, and is connected to each coil of the U-phase, V-phase and W-phase of the drive motor RM on the AC I/O side. A grounded terminal 233 is provided between the terminal 231 and terminal 232, a capacitor C4 is provided between the terminal 231 and terminal 233, and a capacitor C5 is provided between the terminal 232 and terminal 233. An active discharge controller 234 which controls discharge during collision of the vehicle V and the capacitor C3 are provided between the second electric power lines 27p, 27n in parallel relative to the capacitors C4, C5.

The first inverter 23 is configured by bridge connecting for every phase the high-side U-phase switching element and low-side U-phase switching element connected to the U phase of the drive motor RM, the high-side V-phase switching element and low-side V-phase switching element connected to the V phase of the drive motor RM, and the high-side W-phase switching element and low-side W-phase switching element connected to the W phase of the drive motor RM. It should be noted that the drive motor RM of the rear wheels RW may be an electric motor having higher output than the drive motor FM of the front wheels FW.

By ON/OFF driving the switching elements of the above-mentioned respective phases in accordance with the gate drive signals generated at the predetermined timing by the motor ECU 9, the first inverter 23 converts the DC power supplied from the high-voltage DCDC converter 22 into AC power and supplies to the drive motor RM, and converts AC power supplied from the drive motor RM into DC power and supplies to the high-voltage DCDC converter 22.

The DC charging unit 4 is controlled by a PLC unit 7, and is connected to the DC power source to perform charging of the high-voltage battery 21 electric supply and electrical power supply to the primary side. The positive terminal of the DC charging unit 4 is connected to a third electric power line 41p, and the negative terminal of the DC charging unit 4 is connected to a third electric power line 41n. The third electric power line 41p is connected to the terminal 211 of the second electric power line 27p via the terminal 411 and contactor 42, and connected to the terminal 301 of the first electric power line 26p via the terminal 304. The third electric power line 41n is connected to the terminal 229 of the negative bus bar 227 via the terminals 412 and 413 in this order. The contactors 45, 46 are provided in parallel between the terminal 412 and terminal 413 to the third electric power line 41n, a fuse 44 for protection during short circuiting is provided in series on the terminal 412 side to the contactor 45, and a diode 47 having a forward direction which is in a direction from the terminal 413 to terminal 412 is connected in series to the contactor 46.

The high-voltage battery 21 has a positive terminal connected to the second electric power line 27p, a negative terminal connected to the second electric power line 27n, and is connected in parallel between the high-voltage DCDC converter 22 and first inverter 23. For the high-voltage battery 21, the functions of charging and discharging are controlled by the battery ECU 10. In the high-voltage battery 21, a main contactor 212p and contactor 211n are connected in this order in series, and by these turning ON, a capacitor which is not illustrated is formed between the positive terminal and negative terminal. A pre-charge contactor 211p and pre-charge resistor 211r are connected in parallel to the main contactor 212p. A pre-charge contactor 211p and pre-charge resistor 211r are connected in series, and the current through the pre-charge contactor 211p is eased by the pre-charge resistor 211r. When the contactors 42, 45 are turned ON, charging is carried out based on the voltage applied from the DC charging unit 4 to a capacitor which is not illustrated. On the other hand, by the contactor 42 being turned OFF, and the pre-charge contactor 211p and contactor 211n turning ON, the electric charge stored in the high-voltage battery 21 discharges, and current is supplied to the first inverter 23 or high-voltage DCDC converter 22 (hereinafter this is called "pre-charge"). Then, also in the case of the pre-charge contactor 211p being turned OFF, and the main contactor 212p and contactor 211n turning ON, current is supplied to the first inverter 23 or high-voltage DCDC converter 22.

The low-voltage circuit 3 includes: the first electric power lines 26p, 26n connecting the high-voltage side positive terminal 221 and high-voltage side negative terminal 222 of the high-voltage DCDC converter 22 with the DC I/O side of the second inverter 24; the accessory 6; and the AC charging unit 5.

The second inverter 24 is a similar configuration as the first inverter 23, and includes a function of switching between DC power and AC power. The second inverter 24 is connected to the terminal 241 of the first electric power line 26p and terminal 242 of the first electric power line 26n on the DC I/O side thereof, and is connected to each coil of the U phase, V phase and W phase of the drive motor RM on the AC I/O side. The capacitor C6 is provided between the terminal 241 and terminal 242. The active discharge controller 244 which controls the discharge during collision of the vehicle V, and the capacitors C7, C8 are provided in parallel to the high-voltage DCDC converter 22 to the capacitor C6. A grounded terminal 243 is provided between the terminal 245 of the first electric power line 26p and the terminal 246 of the first electric power line 26n, the capacitor C7 is provided between the terminal 245 and terminal 243, and the capacitor C8 is provided between the terminal 243 and terminal 246.

The second inverter 24, by ON/OFF driving the switching element of each phase in accordance with gate drive signals generated at a predetermined timing by the motor ECU 11, converts the DC power supplied from the high-voltage DCDC converter 22 into AC power and supplies to the drive motor FM, and converts the AC power supplied from the drive motor FM into DC power and supplies to the high-voltage DCDC converter 22. It should be noted that the drive motor FM of the front wheels FW may be an electric motor of higher output than the drive motor RM of the rear wheels RW.

The AC charging unit 5 includes an AC charger 53 having a function of converting AC current into DC current, and the output current thereof is supplied to a primary side. The input/output of current to the AC charger 53 is controlled by a charge ECU 54. The AC charging unit 5 and the terminal on the positive side of the AC charger 53 are connected to a fifth electric power line 51p, and the AC charging unit 5 and terminal on the negative side of the AC charger 53 are connected to a fifth electric power line 51n. The fifth electric power line 51p is connected to the terminal 304 and the terminal 301 of the first electric power line 26p via terminal 302. The fifth electric power line 51n is connected to the terminal 303 of the first electric power line 26n via the terminal 228.

The accessory 6 includes an electric compressor, heater, etc., for example. The terminal on the positive side of the smoothing capacitor C9 provided to the accessory 6 is connected to the fourth electric power line 61p, and the terminal on the negative side of the capacitor C9 is connected to the fourth electric power line 61n. The fourth electric power line 61p is connected to the terminal 301 of the first electric power line 26p via the fuse 61 and terminal 302, and the fourth electric power line 61n is connected to the terminal 303 of the first electric power line 26n via the terminal 228. In other words, the accessory 6 is connected in parallel between the high-voltage DCDC converter 22 and second inverter 24.

Therefore, the DC charging unit 4 is connected to the high-voltage source, performs charging to the high-voltage battery 21, and can supply electric power by applying voltage between the first electric power lines 26p, 26n. In other words, in the high-voltage charging path formed by the contactors 42, 45 turning ON, high voltage is applied between the terminals 211, 229. In the low-voltage charging path formed by the contactors 43, 45 being turned ON, low voltage which was stepped down by the DCDC converter 22 is applied between the terminals 229, 301.

In this way, the DC charging unit 4 capable of charging by way of the DC charging source includes: a high-voltage charging path which connects from the DC charging unit to between the high-voltage DCDC converter 22 and high-voltage battery 21; and the low-voltage charging path which connects from the DC charging unit 4 to between the DCDC converter 22 and second inverter 24, and may select the charging path according to the output of an external charging source connected to the DC charging unit 4.

For example, a case is assumed of being a charging source having a charging capacity of 50 (kw) in which the voltage of the charging source connected to the DC charging unit 4 is 400 (V), and the current is 125 (A), which are the maximum values of the rating of the DC charging unit 4. When the contactor 42 of the high-voltage charging path, shared contactor 45 to both paths, and contactors 212p, 211n of the high-voltage battery 21 are turned ON, the current flows to the high-voltage charging circuit. The high-voltage battery 21 is thereby charged.

By equipping the high-voltage DCDC converter 22 in this way, irrespective of the rated voltage of equipment connected to the primary side, since it becomes possible to raise the voltage of the voltage source connected to the DC charging unit 4 up to the rated value of the DC charging unit 4, it is possible to rapidly perform charging.

In addition, the vehicle V according to the present embodiment can perform charging to another vehicle, without using a separate storage battery. The vehicle V, for example, charges the battery of another vehicle by linking the DC charging unit 4 and the charging unit of another vehicle. A PLC unit 7 acquires the system value of another vehicle which is the supply destination linked to the DC charging unit 4, by the voltage sensor 49 provided between the third electric power lines 41p, 41n.

The high-voltage DCDC converter 22 steps down the voltage of the high-voltage battery 21 so as to conform to the acquired system voltage, and supplies to the DC charging unit 4. The charging of another vehicle connected to the DC charging unit 4 is thereby carried out. In other words, upon performing electric supply to outside via the low-voltage charging path, the voltage converter can variably control the voltage on the DC charging unit side in response to the voltage of the external electric supply destination.

Figure 2:
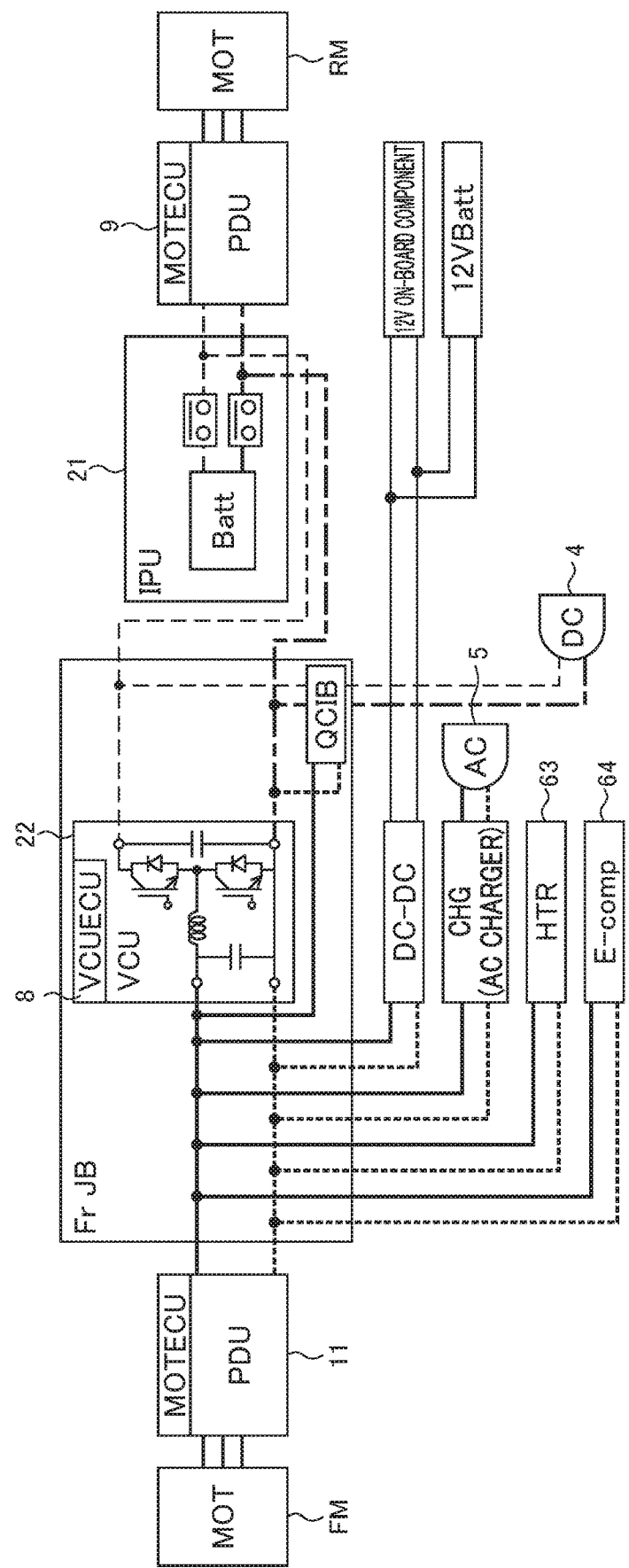
FIG. 2 is a functional block diagram of the power supply system for a vehicle in FIG. 1.

In addition, the vehicle V according to the present embodiment can optimize the drive voltage of accessories connected to the primary side. FIG. 2 is a functional block diagram of the power supply system 1. The accessories consisting of the drive motor FM, PDU 65 controlled by the front motor ECU 11, high-voltage DCDC converter 22, AC charger 53, heater 63 and electric compressor 64 are connected to the primary side of the power supply system 1, and these drive at a low voltage of about 400 (V), for example. For the respective devices of these accessories, there is a drive voltage at which each operates at the highest efficiency, and these voltages differ between devices.

Figure 3:
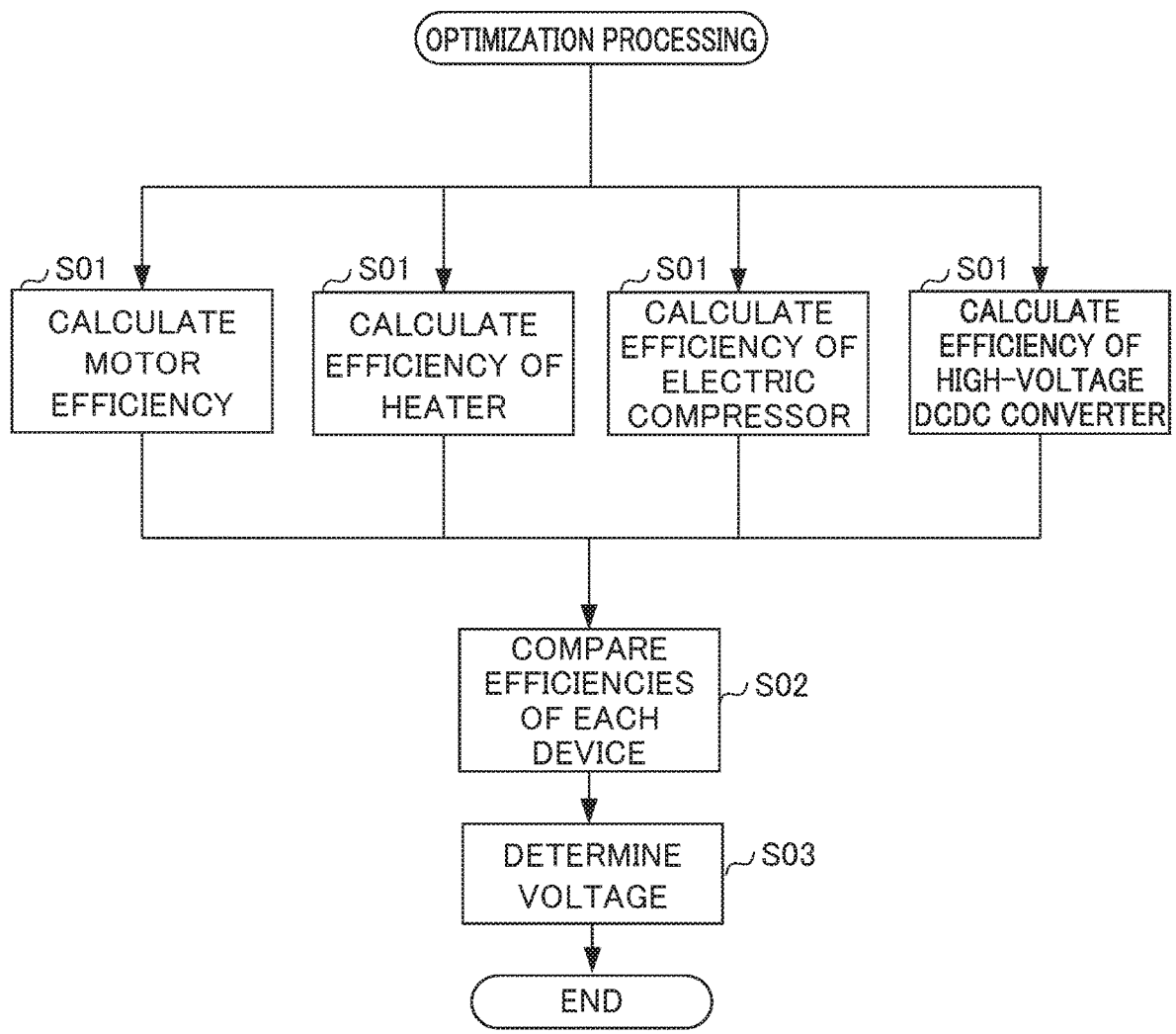
FIG. 3 is a flowchart showing optimization processing according to the first embodiment of the present invention.

FIG. 3 is a flowchart showing the optimization processing of the drive voltage carried out by the VCUECU 8. The optimization processing is always carried out while the power supply system 1 is operating. In Step S01, the VCUECU 8 calculates the efficiency of the motor FM, efficiency of the heater 63, efficiency of the electric compressor 64 and efficiency of the high-voltage DCDC converter by way of parallel processing. FIG. 4 is an example of a table showing the efficiency of each device being retained in advance in the VCUECU 8. When FIG. 4 assumes the efficiency of the electric compressor 64, the electrical efficiency according to operating voltage (columns in FIG. 4) of the electric compressor 64 and the output power (rows in FIG. 4) corresponding to the voltage thereof are recorded in the table. In accordance with the table of FIG. 4, since the power efficiency is 80% when the operating voltage is 100 (V) at the operation point of output power of 2 (kw), the power loss becomes 0.4 (kw) corresponding to 20%. Similarly, since the power efficiency is 70% when the drive voltage is 300 (V), the power loss becomes 0.6 (kw) corresponding to 30%. In this way, at the operating point producing constant output power, it is found that the lost power differs according to the drive voltage. The VCUECU 8 calculates the power loss at every drive voltage using the table relative to other respective devices similarly. It should be noted that the table in FIG. 4 is an example, and as another example, the efficiency of the drive motor FM is retained as a table in which the power efficiency according to the rotation rate and torque is recorded.

In Step S02, the VCUECU 8 sums the lost power at a predetermined drive voltage of each device, changes the drive voltage and compares the lost power at every drive voltage. In Step S03, the VCUECU 8 determines a drive voltage lowest power loss when all devices are driving based on the calculation results in Step S02. The VCUECU 8 drives the high-voltage DCDC converter 22 based on the determined voltage value. In other words, the high-voltage DCDC converter 22 is controlled based on the comparison result between the efficiencies of a plurality of accessories and the efficiency of the drive motor FM of the front wheels FW.

The supply of electric power according to the respective characteristics of a plurality of motors from a single battery thereby becomes possible, and it is possible to provide a system of low cost and low loss.

Figure 5:
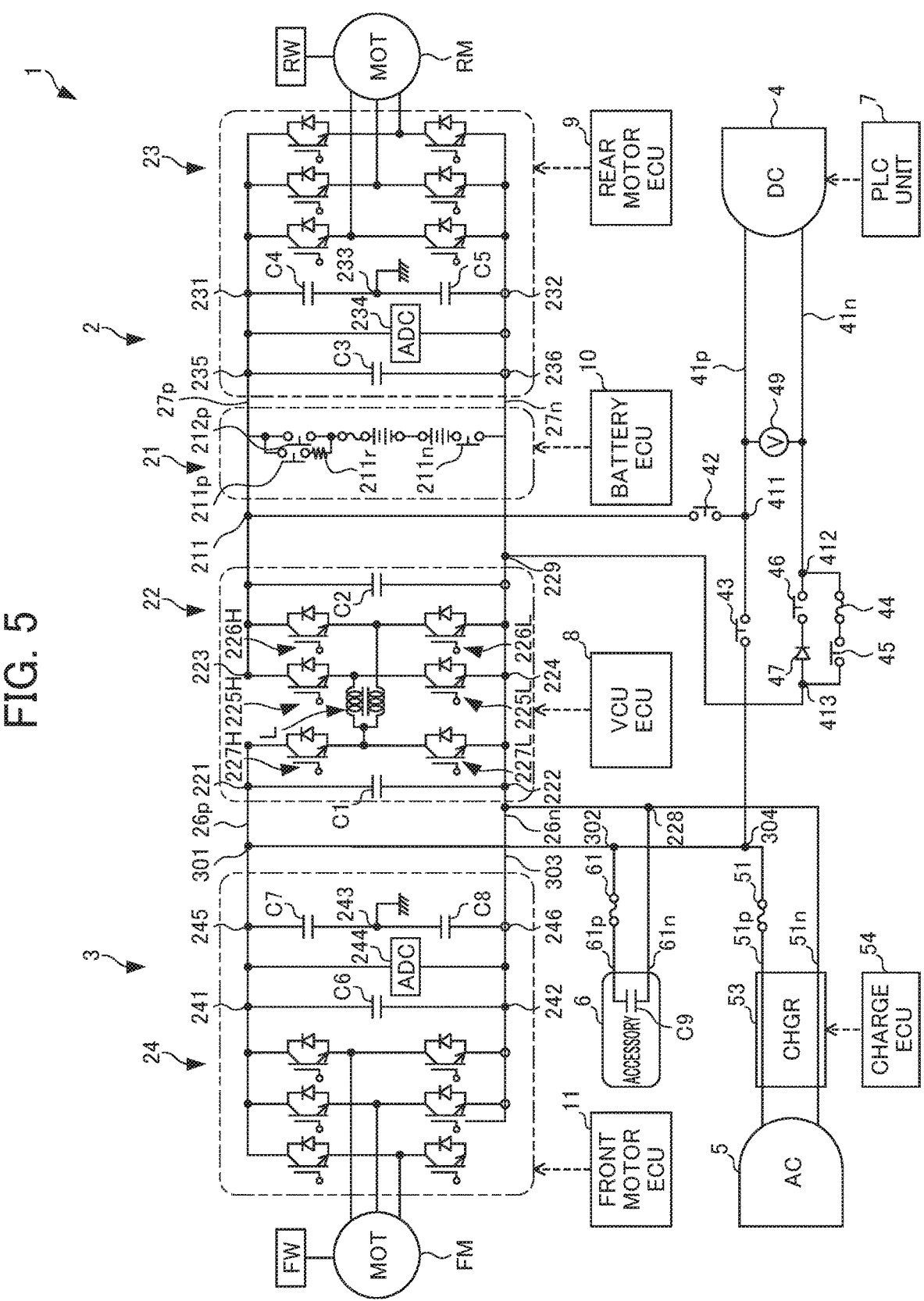
FIG. 5 is a view showing a power supply system for a vehicle according to a second embodiment of the present invention.

A power supply system for a vehicle of the second embodiment will be explained by referencing FIG. 5. The difference from the first embodiment is in the point of switching elements 227H, 227L being added thereto.

The emitter of the switching element 227L is connected between the terminal 222 and terminal 224, the collector of the switching element 227L is connected to the terminal on the primary side of the reactor L and the emitter of the switching element 227H, and the collector of the switching element 227H is connected to the terminal 221. In other words, the switching elements 227H, 227L are connected in parallel to the capacitor C1.

When the charging source is connected to the DC charging unit 4, and the contactors 43, 45 are turned ON, voltage according to the charging capacity of the charger connected to the DC charging unit 4 is applied between the terminal 301 and terminal 229. Similarly to the first embodiment, for example, a case is assumed in which the charging source connected to the DC charging unit 4 is a charging source having a charging capacity of 50 (kw) at 400 (V), and 125 (A) of current, which are the maximum values of the rating of the DC charging unit 4.

In this case, when the voltage of the high-voltage battery 21 is no more than 400 (V), by controlling the switching Duty of the switching element 227H, it becomes possible to perform current control of 125 A and charge in a state in which the voltage of voltage 400 (V) of the charging source of the DC charging unit differs from the high-voltage battery 21. In addition, when the voltage of the high-voltage battery 21 is at least 400 (V), by controlling the switching Duty of the switching elements 225L and 226L upon establishing the switching element 227H in the ON state, it becomes possible to perform current control of 125 A and charge in a state in which the voltage of voltage 400 (V) of the charging source of the DC charging unit 4 differs while flowing 125 A.

In other words, upon performing charging of the high-voltage battery 21, the high-voltage DCDC converter 22 can variably control the voltage on the DC charging unit side (voltage applied to the high-voltage battery 21) in response to the voltage of the external charging source.

In this way, with the second embodiment, it is possible to charge the high-voltage battery 21 in accordance with the voltage of the charging source connected to the DC charging unit 4, also in the case of the voltage of the high-voltage battery 21 being lower than the maximum voltage on the charger side. In other words, irrespective of the state of the storage battery, it becomes possible to always charge in a state in which the charger output is the maximum.

In addition, the vehicle V according to the present embodiment can perform charging to another vehicle without using a separate storage battery, similarly to the first embodiment. Different from the first embodiment is the point of being able to not only step down the voltage of the high-voltage battery 21 so as to suit the acquired system voltage, but also boost and supply to the DC charging unit 4. It is thereby possible to perform charging also to another vehicle with a system voltage higher than the voltage of the battery 21 of the vehicle V connected to the DC charging unit 4. In other words, upon performing electric supply to outside via a low-voltage charging path, the voltage converter can variably control the voltage on the DC charging unit side according to the voltage of the external electric supply destination.

It should be noted that the present invention is not to be limited to the above-mentioned embodiments, and that modifications, improvements, etc. within a scope that can achieve the object of the present invention are also encompassed by the present invention.

EXPLANATION OF REFERENCE NUMERALS

1 power supply system
21 high-voltage battery
23 first inverter
RM drive motor
22 high-voltage DCDC converter
24 second inverter
C1 accessory 6 capacitor
30 current sensor
28 voltage sensor
8 VCUECU

What is claimed is:
1. A power supply system for a vehicle, comprising:
a storage battery;
a first power converter which connects with the storage battery;
a first drive electric motor which connects with the first power converter;
a voltage converter which is connected to the storage battery and steps down voltage of the storage battery;
a second power converter which connects with the voltage converter; and
a second drive electric motor which connects with the second power converter;
a DC charging unit capable of charging by way of a DC charging source;
a high-voltage charging path which connects from the DC charging unit to between the voltage converter and the storage battery; and
a low-voltage charging path which connects from the DC charging unit to between the voltage converter and the second power converter,
wherein the power supply system selects a charging path according to output of an external charging source connected to the DC charging unit, and
wherein the voltage converter variably controls voltage on a side of the DC charging unit according to voltage of an external electric load, upon performing electric supply to outside via the low-voltage charging path.

2. The power supply system for a vehicle according to claim 1,
wherein either one of the first drive electric motor and the second drive electric motor is a front-wheel drive electric motor which drives front wheels, and
wherein the other one of the first drive electric motor and the second drive electric motor is a rear-wheel drive electric motor which drives rear wheels.

3. The power supply system for a vehicle according to claim 2, wherein the second drive electric motor is an electric motor of higher output than the first drive electric motor, and is for rear-wheel driving.

4. The power supply system for a vehicle according to claim 2, wherein the first drive electric motor is an electric motor of higher output than the second drive electric motor, and is for front-wheel driving.

5. The power supply system for a vehicle according to claim 1, further comprising a plurality of accessories connected in parallel between the voltage converter and the second power converter.

6. The power supply system for a vehicle according to claim 5, wherein the voltage converter is controlled based on efficiency of the plurality of accessories and efficiency of the second drive electric motor.

7. The power supply system for a vehicle according to claim 1, wherein the voltage converter variably controls voltage on the side of the DC charging unit according to the voltage of the storage battery, upon performing charging of the storage battery via the low-voltage charging path.

* * * * *